(12) United States Patent
Steelberg et al.

(10) Patent No.: US 8,630,525 B2
(45) Date of Patent: Jan. 14, 2014

(54) VIDEO-RELATED META DATA ENGINE SYSTEM AND METHOD

(75) Inventors: Ryan Steelberg, Irvine, CA (US); Chad Steelberg, Newport Beach, CA (US)

(73) Assignee: Iron Mountain Group, LLC, Irvine, CA (US)

( * ) Notice: Subject to any disclaimer, the term of this patent is extended or adjusted under 35 U.S.C. 154(b) by 568 days.

(21) Appl. No.: 12/456,132

(22) Filed: Jun. 11, 2009

(65) Prior Publication Data

US 2010/0082596 A1 Apr. 1, 2010

Related U.S. Application Data

(63) Continuation of application No. 11/981,838, filed on Oct. 31, 2007.

(51) Int. Cl.
*H04N 5/932* (2006.01)
(52) U.S. Cl.
USPC .......................................... 386/219; 386/200
(58) Field of Classification Search
None
See application file for complete search history.

(56) References Cited

U.S. PATENT DOCUMENTS

| | | | |
|---|---|---|---|
| 7,440,560 B1 * | 10/2008 | Barry | 379/201.01 |
| 2003/0093790 A1 | 5/2003 | Logan et al. | |
| 2003/0208763 A1 | 11/2003 | McElhatten et al. | |
| 2003/0229900 A1 | 12/2003 | Reisman | |
| 2004/0031058 A1 | 2/2004 | Reisman | |
| 2006/0020523 A1 * | 1/2006 | Song | 705/27 |
| 2007/0185876 A1 * | 8/2007 | Mendis et al. | 707/10 |
| 2007/0199988 A1 * | 8/2007 | Labgold et al. | 235/385 |
| 2007/0208711 A1 * | 9/2007 | Rhoads et al. | 707/3 |
| 2008/0046920 A1 | 2/2008 | Bill | |
| 2008/0177726 A1 * | 7/2008 | Forbes et al. | 707/5 |
| 2008/0178198 A1 * | 7/2008 | Gauba | 719/320 |
| 2010/0076866 A1 * | 3/2010 | Steelberg et al. | 705/27 |

* cited by examiner

*Primary Examiner* — William C Vaughn, Jr.
*Assistant Examiner* — Eileen Adams
(74) *Attorney, Agent, or Firm* — Barnes & Thornburg LLP; Thomas J. McWilliams; Edward F. Behm, Jr.

(57) ABSTRACT

A engine for use with a display is disclosed. The engine includes a presenter that presents at least two audio/visual works, at least one software application capable of at least one metadata-related interaction with the at least two audio/visual works, communication points over which the audio/visual works are received, and over which at least a portion of the at least one metadata-related interaction occurs, and a hierarchical taxonomy that effects a common metadata reference to each recurrence of a particular object across the audio/visual works, and across each of the at least one metadata related interaction.

33 Claims, 2 Drawing Sheets

VIDEO-RELATED META DATA ENGINE SYSTEM AND METHOD

CROSS-REFERENCE TO RELATED APPLICATIONS

This application is a continuation of U.S. patent application Ser. No. 11/981,838 entitled "Video-Related Meta Data Engine System and Method", filed Oct. 31, 2007, the disclosure of which is incorporated by reference herein as set forth in its entirety.

U.S. patent application Ser. No. 11/981,838 entitled "Video-Related Meta Data Engine System and Method", filed Oct. 31, 2007 is related to concurrently filed U.S. patent application Ser. No. 11/981,839, entitled "System and Method For Creation and Management of Advertising Inventory Using Metadata", filed Oct. 31, 2007, the entire contents of which are incorporated herein by reference. U.S. patent application Ser. No. 11/981,838 entitled "Video-Related Meta Data Engine System and Method", filed Oct. 31, 2007 is related to concurrently filed U.S. patent application Ser. No. 11/981,763, entitled "Open API Video System and Method of Making and Using Same" filed Oct. 31, 2007, the entire contents of which are incorporated herein by reference.

FIELD OF THE INVENTION

The present invention is directed to video and metadata and, more particularly, to a video-related metadata engine, system and method.

BACKGROUND OF THE INVENTION

Present endeavors to create applications for operation on metadata associated with audio/visual works suffers from the drawback that only certain audio/visual works can have each application applied thereto, in part because there must be an agreement between the application provider and the metadata provider as to the terminology used in the metadata to allow for operation by the application.

Thus, there exists a need for a video engine interoperable with a common nomenclature across all applications and audio/visual works, thereby allowing for standardized interaction between any application and any audio/visual work.

SUMMARY OF THE INVENTION

The present invention includes at least a video engine, system and method for use with a video player, including a presenter that presents at least two audio/visual works, at least one software application capable of at least one metadata-related interaction with the audio/visual works, communication points over which the audio/visual works are received, and over which at least a portion of the at least one meta-data interaction occurs, and a hierarchical taxonomy that effects a common metadata reference to each recurrence of a particular object across the audio/visual works, and across each of the at least one metadata-related interaction. The video engine, system, and method may additionally include a prioritization data for use with the metadata.

Thus, the present invention provides a video engine interoperable with a common nomenclature across all applications and audio/visual works, thereby allowing for standardized interaction between any application and any audio/visual work.

BRIEF DESCRIPTION OF THE FIGURES

Understanding of the present invention will be facilitated by consideration of the following detailed description of the preferred embodiments of the present invention taken in conjunction with the accompanying drawings, in which like numerals refer to like parts.

DETAILED DESCRIPTION OF THE PREFERRED EMBODIMENTS

It is to be understood that the figures and descriptions of the present invention have been simplified to illustrate elements that are relevant for a clear understanding of the present invention, while eliminating, for the purposes of clarity, many other elements found in typical interactive, metadata, and video play systems and methods. Those of ordinary skill in the art will recognize that other elements are desirable and/or required in order to implement the present invention. However, because such elements are well known in the art, and because they do not facilitate a better understanding of the present invention, a discussion of such elements is not provided herein.

Figure 1:
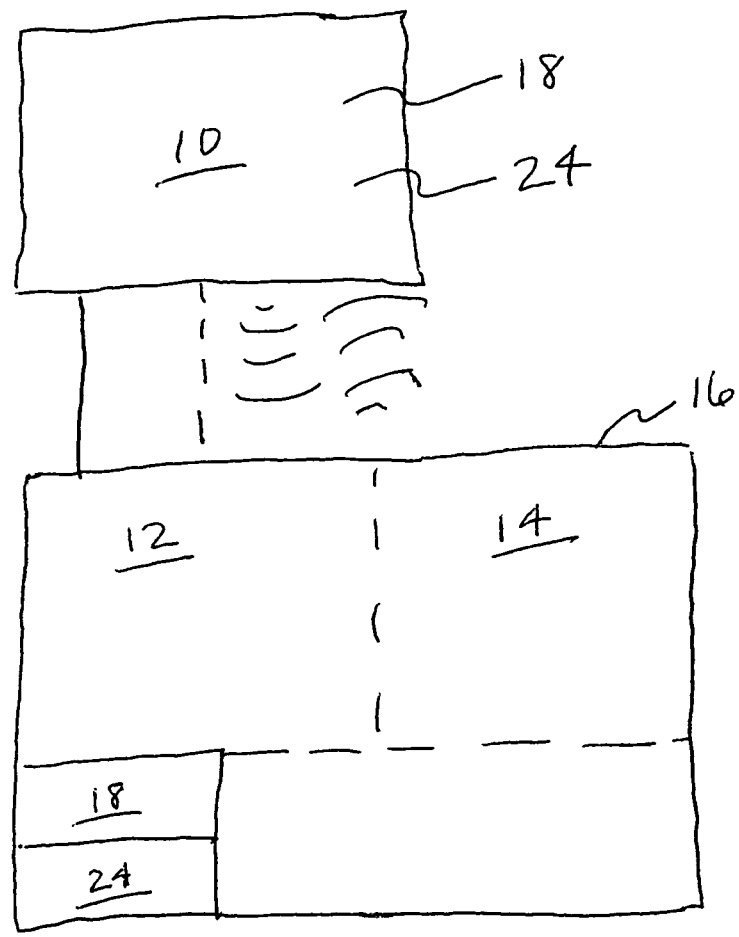
FIG. 1 illustrates a video player in accordance with the present invention.

FIG. 1 is a block diagram illustrating an audio/video media player 10 (hereinafter videoplayer) having associated therewith software 12 and hardware 14, in the form of a video engine 16, for the playing of audio/visual works 18 on the videoplayer 10 (the software and hardware referred to hereinafter as a video engine). The videoplayer as discussed herein may include any type of videoplayer that makes use of any audio/video media for playing on the videoplayer. The videoplayer may be, but is not limited to, televisions, desktop and laptop computers, personal digital assistants (PDA), personal entertainment devices, such as IPODs, mobile telephones, and the like, typically having video processing and play capabilities.

The video engine 16 of the present invention operates in conjunction with a video player 10 in order to present audio~/visual works to a user of the videoplayer. The video engine includes all hardware necessary to execute the playing of the video on the videoplayer, and additionally includes one or more software applications capable of presenting not only audio/visual works, but additionally capable of manipulating user interaction with such audio/visual works, or manipulating such audio/visual works themselves. The software aspects and applications of the video engine may be partly or entirely remote from the videoplayer, such as to allow for development of applications, interactions or data manipulations remote from the audio/visual work(s), or may be entirely local to the videoplayer. Such software applications may interact with the audio/visual works via, for example, locally or remotely generated meta data 24 embedded in or associated with the audio/visual work, or a meta data stream received by the video player and video engine separately from, and or in conjunction with, the audio/visual work or audio/visual work stream.

The video engine, as used herein, may include any software application capable of receiving audio/visual works and instructions associated therewith, and additionally capable of relaying instructions and/or commands to an from at least one manipulation of or interaction with such audio/visual work. A video engine may be, but is not limited to, a digital video recorder, a computer hard drive in association with one or more processors, a micro processor in conjunction with a video processor, or the like. The video engine may include typical hardware and/or software to allow for viewing of or interaction with an audio/visual work, such as a hard drive, random access memory, flash memory, or the like, and may receive and/or communicate the audio/visual work, commands, interactions and/or instructions from and to communication points via, for example, satellite communication, radio communication, wired communication, infrared communication, coaxial cable communication, WIFI communication, WiMAX communication, LAN communication, WAN communication, telephonic communication, DSL communication, Ethernet communication, or the like as would be known to those skilled in the art.

Metadata 24 as used herein, encompasses any type of computer readable information that may be associated with an audio/visual work, any object therein, or any portion thereof, including the formation or portions thereof, or that may be used for interaction thereupon or therewith, as will be understood by one of ordinary skill in the art. Metadata, as used herein, is defined to include any type of executable code, computer language code (such as xml or html, object code and/or source code), or "mash-up" data (program associated data integral with data of interest) that may be associated with or into an audio/visual work. Metadata further includes metadata created through the use of the present invention and pre-existing metadata that may be, form part of, or be associated with the audio-visual works on which the present invention is operated. As discussed hereinthroughout, interactivity with an audio/visual work may include manipulation of the audio/visual work itself, manipulation of a menu, overlay, or the like associated with such audio/visual work, off-line accessing or content requests for content associated with such audio/visual work or with such interaction with such audio/visual work, and peer to peer interactivity, for example. As such, the present invention makes available interactivity with an audio/visual work of any type known to one of ordinary skill in the art, and interactivity between any entities as such interaction may relate to an audio/visual work, including server entities known to those skilled in the art, and the obtaining of information related to, based in, or related to information related to or based in, an audio/visual work, over any communications media, as will be apparent to one of ordinary skill in the art.

Figure 2:
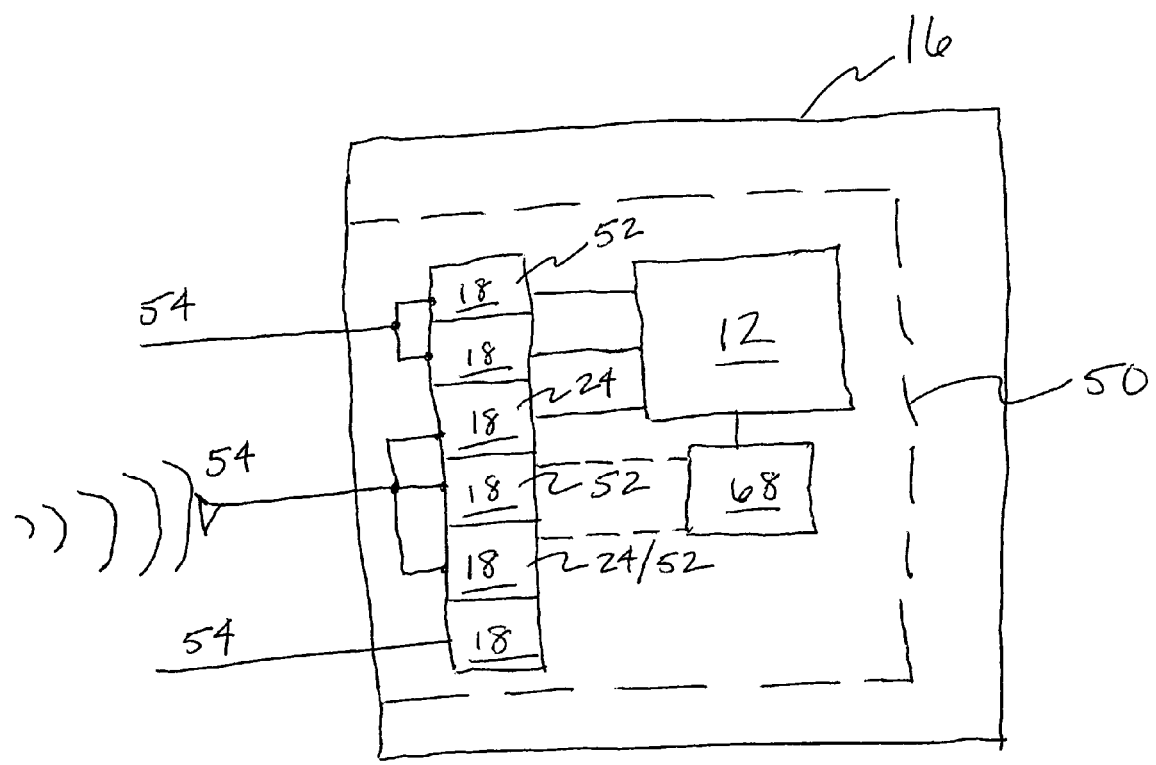
FIG. 2 illustrates a video player-related hierarchical taxonomy in accordance with the present invention.

As shown in FIG. 2, the present invention thus is and includes within the video engine 16 a hierarchical taxonomy 50 for making common reference to items, objects, or portions 52 of and within audio/visual works across multiple audio/visual works 18 and across multiple interactivity planes 54 and/or interactive applications 12 for interacting with ones of the multiple audio/visual works. Thus, in ~n exemplary embodiment of the present invention, one, several, or every object in every audiovisual work, and/or one or more portions or topics of portions of one or more audio/visual works, may be assigned a common nomenclature having set nomenclature to reference such object(s) at each of different levels of a hierarchy, with such nomenclature, and nomenclature at such levels, being common across all audio/visual works in accordance with the metadata indicative of each object or portion, as referred to at each such hierarchical level, in each such audio/visual work.

Thus, in the present invention the metadata associated with each such audio/visual work is built, such as by manual entry after review of the audio/visual work, or by automated object (audio and/or video and/or character) recognition, which may employ a "crawler" to review many audio/visual works, to use the proper, common nomenclature for each object or portion within and of the work upon every reference to that object or portion across all audio/visual works making reference to that object or portion. For example, the hierarchy may include any number of top level categories, such as "fashion", "automotive", "health and leisure", and the like. Needless to say, the present invention is by no means limited to the aforementioned list, and in fact includes top level hierarchal nomenclature in each category of an object or video portion that may appear in an audio/visual work, as will be apparent to those skilled in the art. The hierarchical nomenclature of the present invention is systematically applied with a particular view to those items in an audio/video work that might be of most interest, such as to a consumer or advertiser, as will also be apparent to one or ordinary skill in the art, In the example mentioned above, the top level hierarchy "fashion" may include any number of subcategories, such as "suits", "dresses", "shoes", "accessories"~and the like. Again, it goes without saying that the aforementioned list is in no way limiting, but rather the importance of the aforementioned list lies in the fact that the nomenclature in each of the hierarchal categories within the hierarchical taxonomy of the video engine is not varied, with respect to its metadata application to objects and portions within audio/visual works, nor is it varied across audio/visual works.

Continuing with the example hereinabove, the sub category "accessories" may include, for example, "purses". Thus, the metadata associated with any audio/video work having an object therein qualifying as a purse would either be manually recognized or automatically recognized, and labeled for use via the video engine in accordance with the nomenclature hierarchy as 1. Fashion, 1A. Accessories, 1AA. Purses.

Upon reaching any particular level of the nomenclature hierarchy, more specific references may or may not be employed based on the intended use of the audio/visual work, but any more specific references must be employed in accordance with the nomenclature hierarchy. For example, a consumer who watches audio/visual words may wish to employ the nomenclature to access video snippets based on references to that consumer's favorite baseball team. In such a case, the initial hierarchy employed by the application that accesses, using associated metadata, particular vide snippets may be "professional sports", the sub-category may be "major league baseball", and a specific reference may be "Philadelphia Phillies". No additionally specific references may be necessary for such a use, and thus may not be provided by the party generating the metadata, although other deeper sub-categories, such as player names, field names, positional data, former player, etc. may be available in the nomenclature hierarchy for common use in other applications requiring such depth.

As an example of use of the deeper hierarchy, in the event that an advertiser wishes to make use of the engine of the present invention, more specific hierarchy levels may be employed by an advertiser application using the metadata associated with the audio/visual work. For example, in the reference hereinabove to "purses", Gucci may wish to advertise its own brown purses in certain cases when the object purse is shown in an audio/visual work, but only a very specific purse. Thus, advertisers may make use of more specific hierarchy levels, such as, under the sub-category of "purses", categories for "Gucci" purses, and then "brown" Gucci purses (of course other purse colors, types of Gucci purses, model years of Gucci purses, etc., may be made of use at this level of the hierarchy), leading to the reference, by the metadata, to an advertisement external to the audio/visual work (which may be accessible over one or more of the communication access points) only in the event the viewer of the audio/visual work interacts with a brown, Gucci purse object. Needless to say in light of the disclosure herein, the nomenclature hierarchy of the present invention may include a translator, whereby the nomenclature of one human language (or computer language) is precisely and consistently translated into the common terminology of another language, with no loss of commonality in any language.

Therefore, although different levels of the nomenclature hierarch3 (may be employed by different users of audio/visual works, or by different applications associated via the metadata with the audio/visual works, the hierarchal nomenclature references employed are the same at any respective level across all users, across all audio/video works, and across all items, objects or video portions of that type. Of course, this aspect of the present invention makes available a number of advantageous presentations for association with audio/visual works. For example, in the exemplary embodiment discussed above, Gucci may wish to place an overlay advertisement in the lower right hand corner of any audio/visual work making reference to purses, or may wish to place an overlay advertisement only with respect to those audio/visual works that make reference to brown purse, or only brown, Gucci purses. However, it must be noted that such choices are not made available in the prior art in any event in any audio/visual work, due to the fact that, without a video engine having a common nomenclature hierarchy to create common references across all audio/visual works, the lack of consistent reference to objects makes searching for multiple appearances of such objects or video portions across multiple audio/visual works difficult if not impossible.

In view of the video engine supplying a common hierarchical nomenclature as discussed above, applications and/or audio/visual filters may be developed to allow access to, interaction with, or reference to particular items, objects, or video portions across all videos created anywhere for play over any media. For example, in the exemplary embodiment discussed above, a user may access a video filter or video application that allows that user to record, or view, or buy, or the like, by interaction with any reference to a brown Gucci purse in any video across all videos. Such a filter or application may, of course, attempt to metadata tag only those audio/visual works deemed most likely, such as based on a prioritization filter, to make the requested reference in the audio/visual work, or may crawl across all audio/visual works on all media obtainable to the video engine via any media accessible over the communication access points.

Of course, even using the video engine of the present invention to create a common nomenclature across consistent objects among all video works, the task of assessing a particular object or objects across a great many video works may be overwhelming. Thus, the video engine of the present invention may be programmed with the aforementioned prioritization filter 68, whereby, based on a user type of the video engine user, the prioritization filter 68 prioritizes the level of the hierarchy at which review is best to occur, the media type over which review of audio/visual works is best to occur, or the type of communication access point that the most desired customers have the highest likelihood of using, for example. Thus, the video engine of the present invention may make use of empirical data in the application of the nomenclature hierarchy to arrive at the most desired result of nomenclature assignment for any particular application. Additionally, this empirical data may be accessed from any communication access point, and thus any media type, to which the video engine has access, such as by obtaining empirical video over the interact, from television broadcasts, from the frequency of the play of certain commercials or other audio/visual works over internet, radio, personal electronic device, or television, and the like. Additionally, certain user types may be polled, such as by polling developers or advertisers as to the manner of prioritization for accessing audio/visual works having particular nomenclature therein. Thereby, the meta data in compliance with the hierarchy may be exposed for use nakedly or in any available application, or for development of applications or filters, by users, advertisers, and developers, etc.

Yet more specifically, it has been approximated that there are over one trillion hours of digitized video available through a variety of media sources. Each such audio/visual work may have corresponded thereto metadata that is indicative of and allows for interaction with the audio/video work, portions thereof and objects therein. Consequently, an additional function performed by the video engine of the present invention may be prioritization of that video or those objects which must be primarily, secondarily, tertiary, etc. associated with metadata or a metadata stream. It will be apparent to those skilled in the art that this prioritization may either form a portion of the video engine, and may thereby mark different videos viewed by different users with the same nomenclature hierarchy, while simultaneously reporting such marking of objects (and which videos or video portions have been so marked) back to a remote operations hub 70, or a remote operations hub may likewise begin the process of marking videos with the nomenclature hierarchy for feed to local video players alongside the audio/visual work feed. Of course, in undertaking the prioritization of which videos should be marked first (primarily), and which objects within Which videos should be marked first, the focus may be on one or more of a variety of factors, including but not limited to: high desirability of sponsorship for videos or objects; high volume of viewers of particular videos, video types, or with desire to see particular objects; number of likely references to particular objects and correspondent actions necessary by the nomenclature engine to name all such objects in all such videos; likely order of executed affiliations subscribing to the common nomenclature of the present invention. Other factors may, of course, be apparent to those of ordinary skill in the art.

In one of the aforementioned exemplary embodiments, metadata within the common nomenclature may be prioritized for application to those objects having the highest desire for use by the highest desirability advertisers. Thus, those objects that advertisers get premier return on investment for advertising in association with, and/or those items that advertisers otherwise most wished to be affiliated with, may provide an opportunity for the highest priority objects and or videos to be marked by the video engine in response to the prioritization instruction. Additionally and alternatively, metadata marking may be prioritized to those audio/visual works that are most frequently watched by users, such as broadcasts of the National Football League. By thus marking the most popular objects within the most popular programs, a variety of other economic avenues and applications may be opened, such as, using the example of the NFL, advertisers placing highest priority on the highest watched programs, and users having the greatest desire for interactivity with the highest watched programs (such as through being fans of a team or a participant in fantasy sports with regard to the NFL example above). There is a likely increase in an advertiser's desire to be affiliated with programming, and objects within such programming, that have been the subject of such an indication that such programming and/or such objects are among the most watched or interacted with.

Prioritization thus may primarily target, for example, network shows in prime time. Further, such prime time shows may have a limited number of objects in each video frame, or may have objects that need be metadata tagged only once because they are re-used week aider week. Such frequent objects may include, for example, background sets that appear in many scenes every week and that, when interacted with by a user, may have the same metadata linked thereto every week, such as the New York City tourism board and/or Wikipedia/New York if New York City is in the background often. Of course, as will be apparent to one skilled in the art in view of the discussion herein, in the aforementioned New York example, the video engine, through the prioritization, will insure that the reference to the New York skyline is consistent across all videos, which may thereby allow applications using the metadata associated via that reference to make various manipulations based on the New York skyline in any video, without having to view the video before programming the application. For example, and application may provide that, each time the New York skyline appears, in any video, the viewer may cursor over the skyline, click or hit enter, and be taken to the New York state tourism board. Similarly, due to the multiple levels of the nomenclature hierarchy, an application may link to a September 11 memorial site if the user cursors over the pre-Sep. 11, 2001 New York skyline in any video, but may link to a different location, via metadata tagging, if the user cursors over the New York skyline in any video showing the post 9/11 skyline. Of course, the interaction by the viewer itself may vary from application to application, and may include "mousing over" an object, clicking an object, calling up a menu or overlay on a scene or an object, pausing the video to interact, not pausing the video, and the like.

Prioritization may additionally allow for differentiation of the worth of object, videos, or video portions, such as for advertisers. For example, a little known object in a home made online video may have low priority, and thus lower worth, such as for the purchase of an advertisement to be associated with an object in such a video. However, a well known object in a prime time network television video may have high priority, and thus high worth, and may thereby demand premium payment for advertisements associated with such objects.

Steps may be taken to simplify the exercise undertaken by the prioritization, such as the reference above to having millions of video engines marking, using the common nomenclature, millions of videos under the supervision of a remote operations center. For example, in the event the common nomenclature is to be manually associated with objects in a video work for sending outbound from the remote operations center to the local video players, the resolution of the audio/visual work used to manually enter the corresponded metadata may be lower than that desirable for view by a user.

The prioritization of application of metadata to certain objects or videos, or the depth of the hierarchy to which such applications are performed, will vary in accordance with the user, the target, the application creator, and the like. For example, applications using the metadata built by or approved by professional sports leagues may make use of their own sports broadcasts in the applications they build at only a very high level of the hierarchy, and only with respect to very few programming objects. As such, lower levels of the hierarchy, or other objects, may be more readily available in such league broadcasts to other application creators. However, applications for shows on a food-related channel may make use of very deep hierarchical levels, such as food brands, kitchen utensils, expirations dates, and the like. The intelligent prioritization of the present invention may elect, with regard to what videos and/or what objects, the vertical depth in the hierarchy for application of the common nomenclature metadata tagging on a case-by-ease basis.

Although the invention has been described and pictured in an exemplary form with a certain degree of particularity, it is understood that the present disclosure of the exemplary form has been made by way of example, and that numerous changes in the details of construction and combination and arrangement of parts and steps may be made without departing from the spirit and scope of the invention as set forth in the claims hereinafter.

We claim:

1. A video engine for use with a display, comprising:
   a computing processor;
   a data storage device in communication with the processor and storing instructions which, when executed on the processor, implement:
      a presenter that presents at least two audio/visual works on the display;
      at least one software application capable of at least one interaction with metadata corresponding to objects that appear in the at least two audio/visual works;
   at least one communication point that interfaces with a network which includes at least one of satellite communication, radio communication, wired communication, infrared communication, coaxial cable communication, WIFI communication, WiMAX communication, LAN communication, WAN communication, telephonic communication, DSL communication, and Ethernet communication, over which the audio/visual works are received, and over which at least a portion of the at least one metadata-related interaction occurs; and
   wherein the metadata corresponding to objects that appear in the audio/visual works is compliant with exactly one hierarchical taxonomy that effects a common metadata reference to each recurrence of at least one object appearing in ones of the audio/visual works as part of the works,
   wherein each of the at least one metadata related interaction(s) corresponds to one of the recurrences and its metadata reference.

2. The video engine of claim 1, wherein at least one of the at least one software applications is at least partially remote from the presenter.

3. The video engine of claim 1, wherein the at least one metadata-related interaction comprises interaction with remotely generated metadata associated with the audio/visual work.

4. The video engine of claim 1, wherein the at least one metadata-related interaction comprises interaction with locally generated metadata for association with the audio/visual work.

5. The video engine of claim 1, wherein the hierarchical taxonomy comprises at least three categories of breadth and at least three levels of depth for the common metadata references.

6. The video engine of claim 1, wherein the hierarchical taxonomy comprises at least categorical pricing.

7. The video engine of claim 1, wherein at least a portion of the common metadata references are automatically associated with the objects of the audio/visual works.

8. The video engine of claim 7, wherein the automatic association occurs remotely from the presenter.

9. The video engine of claim 7, wherein the automatic association occurs locally to the presenter.

10. The video engine of claim 7, wherein the automatic association occurs via object recognition software.

11. The video engine of claim 10, wherein the object recognition software is employed as part of a crawler that reviews the audio/visual works.

12. The video engine of claim 1, wherein at least a portion of the common metadata references are manually associated with the objects of the audio/visual works.

13. The video engine of claim 12, wherein the manual association occurs remotely from the presenter.

14. The video engine of claim 12, wherein the manual association occurs locally to the presenter.

15. The video engine of claim 1, further comprising a prioritization filter.

16. The video engine of claim 15, wherein the prioritization filter prioritizes the order of making of the common metadata references.

17. The video engine of claim 15, wherein the prioritization filter prioritizes the level of the hierarchical taxonomy at which the common metadata references are reviewed for a particular one of the metadata-related interactions.

18. The video engine of claim 15, wherein the prioritization filter prioritizes the communication point over which review is to be made for particular ones of the common metadata references.

19. The video engine of claim 15, wherein the prioritization filter makes use of empirical data external to the audio/visual works to prioritize application of the common metadata references.

20. An engine for use with a display, comprising:
a computing processor;
a data storage device in communication with the processor and storing instructions which, when executed on the processor, implement:
a presenter that presents at least two audio/visual works on the display;
at least one software application capable of at least one interaction with metadata corresponding to objects that appear in the audio/visual works;
at least one communication point that interfaces with a network which includes at least one of satellite communication, radio communication, wired communication, infrared communication, coaxial cable communication, WIFI communication, WiMAX communication, LAN communication, WAN communication, telephonic communication, DSL communication, and Ethernet communication, over which the audio/visual works are received, and over which at least a portion of the at least one metadata-related interaction occurs, wherein at least a portion of the at least one metadata-related interaction matches discrete appearances in said audio/visual works of specific products;
wherein the metadata corresponding to objects that appear in the audio/visual works is compliant with exactly one hierarchical taxonomy that effects a common metadata reference to each recurrence of at least one of the specific products appearing in ones of the audio/visual works as part of the works;
wherein each of the at least one metadata related interaction(s) corresponds to one of the recurrences and its metadata reference.

21. The engine of claim 20, wherein said matching includes a link to a merchant of said specific products.

22. The engine of claim 20, wherein said metadata includes pricing of items in said works.

23. The engine of claim 20, wherein the specific products are fashion-related products.

24. The engine of claim 20, wherein the specific products are home design products.

25. The engine of claim 20, wherein the specific products are electronics products.

26. The engine of claim 20, wherein the specific products are travel products.

27. The engine of claim 20, wherein the specific products are sporting products.

28. The engine of claim 20, wherein said specific products are exact matches to the discrete occurrences in said works.

29. The engine of claim 20, wherein said specific products are similar looking to the discrete occurrences in said works.

30. The engine of claim 20, wherein said specific products are of similar quality and style to the discrete occurrences in said works.

31. The engine of claim 20, wherein said specific products are related to said discrete occurrences in said works.

32. The engine of claim 31, wherein said relation is based on database information.

33. The engine of claim 31, wherein said relation is based on survey information.

* * * * *